Figure 3:
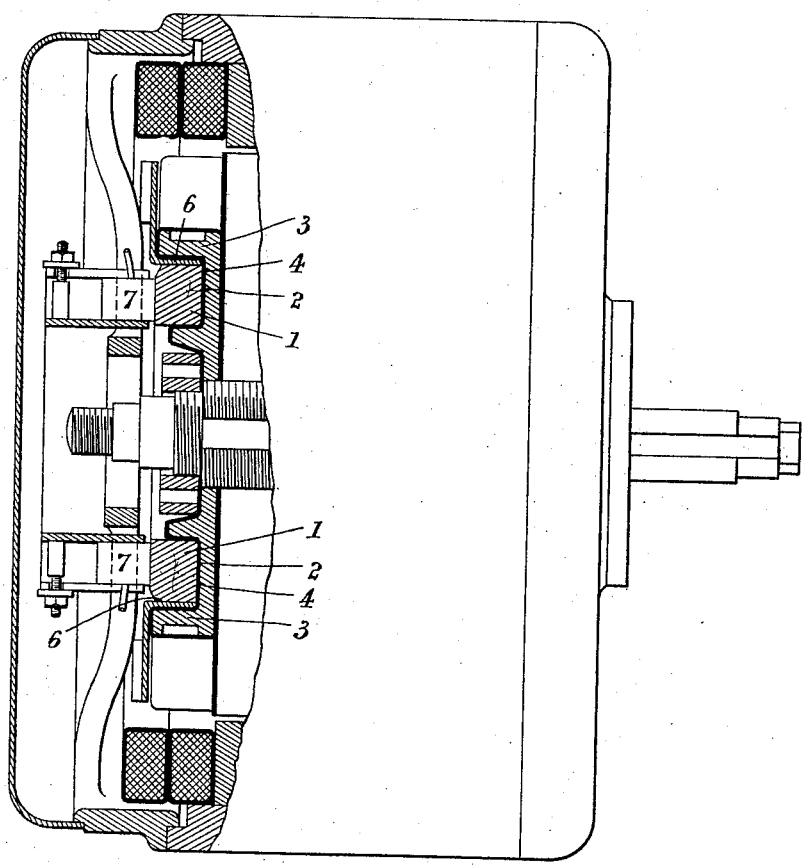

W. H. SCOTT.
COMMUTATOR.
APPLICATION FILED JUNE 13, 1917.
1,318,808.
Patented Oct. 14, 1919.
2 SHEETS—SHEET 1.
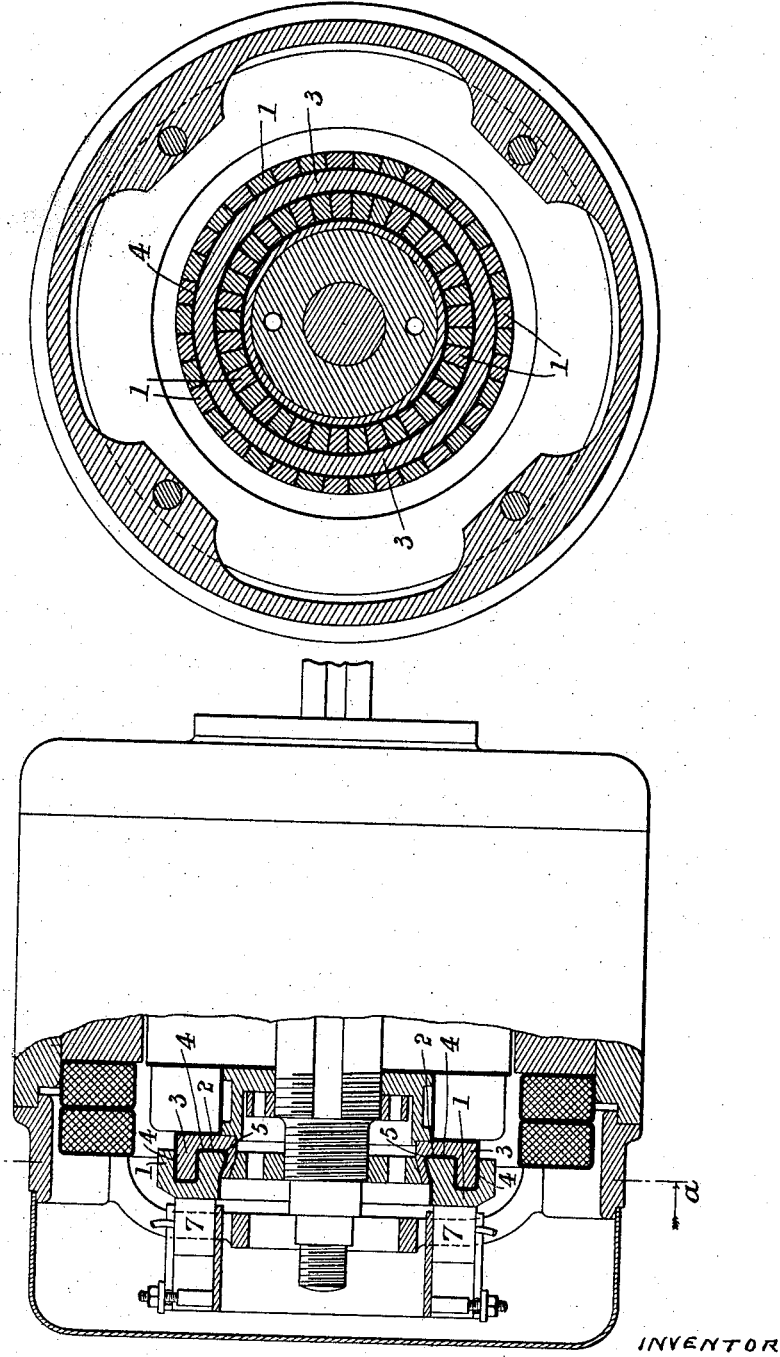
INVENTOR
WILLIAM HARDING SCOTT
BY
ATTORNEYS

W. H. SCOTT.
COMMUTATOR.
APPLICATION FILED JUNE 13, 1917.

1,318,808.

Patented Oct. 14, 1919.
2 SHEETS—SHEET 2.

INVENTOR
WILLIAM HARDING SCOTT
BY
ATTORNEYS

UNITED STATES PATENT OFFICE.

WILLIAM HARDING SCOTT, OF NORWICH, ENGLAND.

COMMUTATOR.

1,318,808.   Specification of Letters Patent.   Patented Oct. 14, 1919.

Original application filed May 20, 1915, Serial No. 29,378. Divided and application filed June 20, 1916, Serial No. 104,816. Divided and this application filed June 13, 1917. Serial No. 174,566.

*To all whom it may concern:*

Be it known that I, WILLIAM HARDING SCOTT, a subject of the King of Great Britain, residing at Gothic Works, Norwich, in the county of Norfolk, England, have invented new and useful Improvements in Commutators, of which the following is a specification.

My invention relates to commutators for electric motors, or dynamos, especially those intended for starting, or igniting, the internal combustion engines of motor road-vehicles, and for other purposes where the weight should be as small, and the arrangement as compact, as possible, although it is not limited to these.

The present application is a division of my application Serial No. 104,816, filed June 20, 1916, which in turn is a division of my application Serial No. 29,378, filed May 20, 1915.

I may remark that I prefer to use a number of poles not, in any case, less than four, while for starting-motors fixed on the crank-shaft, or gear-box shaft, I prefer that the number of poles shall not be less than eight and it may even, in some cases, be as many as sixteen, but I do not limit myself to any particular number of poles.

According to my invention I employ commutators with their sections so arranged that their contact surfaces are radial and, where there is a considerable diameter under the windings (for example when a large number of poles is used) I may arrange the commutator inside, or partly inside, the armature windings, thereby considerably shortening the armature. The commutator sections, in either case, are according to my invention fixed in place in their support, or supports by squeezing, or pressing, the metal (usually copper) into an insulated trough, or channel, or recesses, in such support, or supports so that the said metal is caused to fit tightly in the said trough, or channel, or recesses.

I will describe, with reference to the accompanying drawings, how my invention may be performed.

Figure 1 is a side elevation, partly in longitudinal section, of sufficient of a machine to illustrate the application of my invention thereto and Fig. 2 is a cross-section on the line *a, a,* Fig. 1, (looking in the direction of the arrows.) Fig. 3 is a side elevation partly in section, showing a modification with the commutator inside the armature windings. In the several figures the corresponding parts are marked with the same reference numerals.

The commutator sections have radial contact surfaces, and, as aforesaid, where there is a considerable space within the armature, (as is the case for instance when a large number of poles is used), I may arrange the commutator entirely, or partly, inside the armature and its windings and thus make the machine considerably shorter.

The commutator sections 1, are fitted into a channel, or trough 2, in a support such, as the ring 3, of suitable material such, for example, as steel insulated by any suitable material 4, such as mica, for example, and the sections 1, are then subjected to pressure so that they are shortened, but extended in other directions, and so are made to tightly fill, and become secured in, the channel, or trough 2, and, if desired, the inner side, or sides, of the channel or trough 2, may be so shaped, or undercut, as shown, for example, at 5, in Fig. 1, that the sections 1, are locked therewith when pressed as aforesaid, but this is not essential as the pressure will cause the sections to be firmly fixed even in a trough, channel or recesses, with parallel sides, and this is illustrated in Fig. 3. Copper, or like strips, may be used for connecting purposes these strips being firmly fixed in position between the insulated sides of the channel, trough, or recesses, and the commutator sections when the commutator sections are pressed and expanded into the channel, trough or recesses, as aforesaid. This is illustrated at 6, in Fig. 3, but is not shown in Figs. 1, and 2, although of course it may be similarly used in that case also. The brushes will have corresponding radial faces. They are indicated at 7.

What I claim is:—

1. The method substantially as herein described of forming a commutator for an electric motor, said method consisting, essentially, in recessing the face of a suitable support and securing commutator sections of ductile metal thereto by first fitting the sections in said recess and then deforming the sections by pressure to cause them to be expanded radially in and to tightly fill the recess and to be thereby rigidly secured to the support.

2. The method substantially as herein described of forming a commutator for an electric motor, said method consisting, essentially, in channeling a suitable support and undercutting the channel on its inner face, then fitting commutator sections in said channels and subjecting the sections to pressure to deform them so that they are shortened in one direction and extended in other directions and are made to tightly fill the channel and become rigidly secured therein and to the support.

In testimony whereof I have signed my name to this specification in the presence of two subscribing witnesses.

WILLIAM HARDING SCOTT.

Witnesses:
 EDWARD CHARLES HAMMOND,
 EDWARD GEORGE DAVIES.